Jan. 14, 1964     E. LUDLOW ETAL     3,117,650
SILENCING ELEMENT FOR EXHAUST GAS CONDUIT
Filed Dec. 4, 1961     2 Sheets-Sheet 1
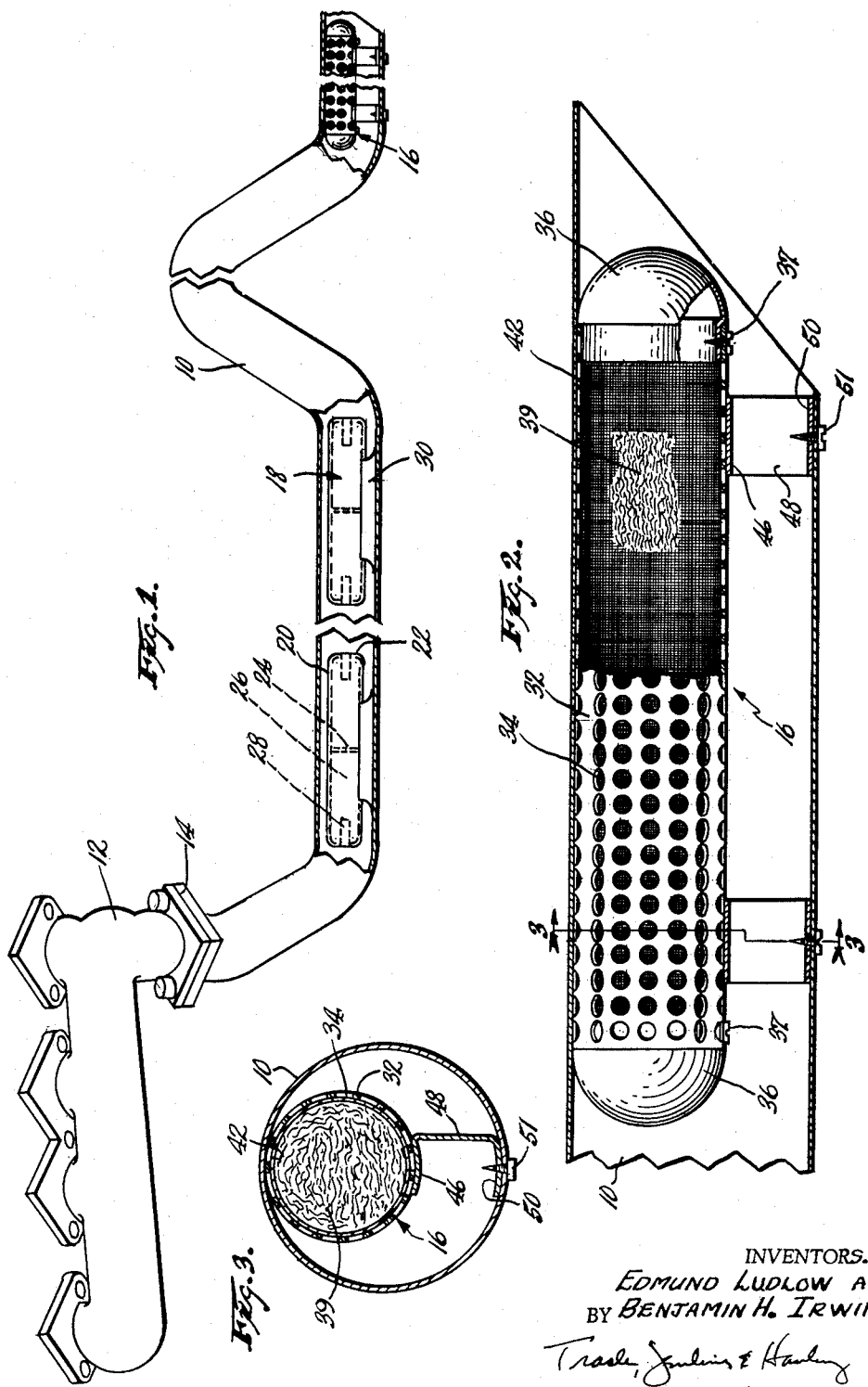
INVENTORS.
EDMUND LUDLOW AND
BY BENJAMIN H. IRWIN
ATTORNEYS

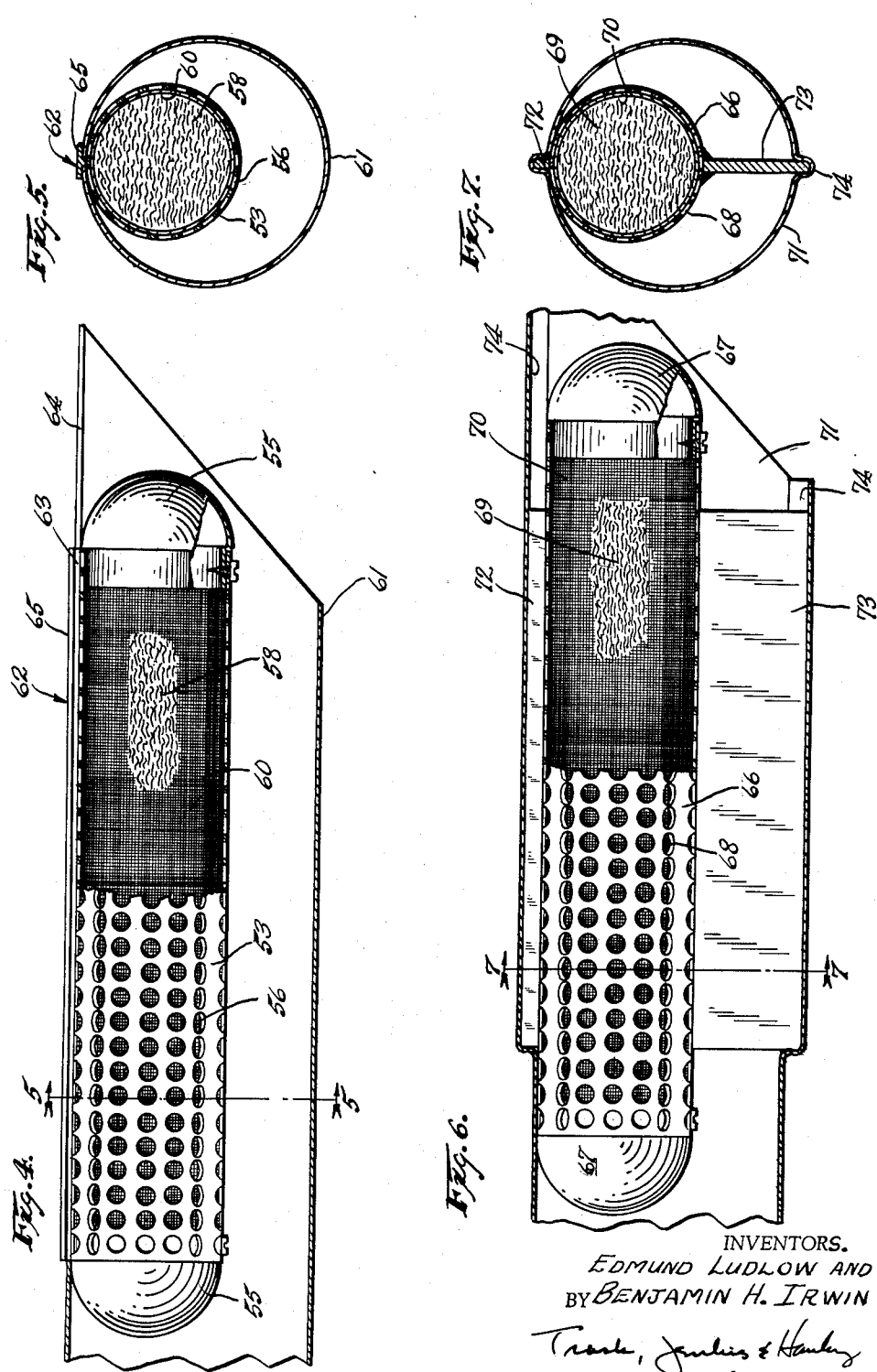

3,117,650
SILENCING ELEMENT FOR EXHAUST
GAS CONDUIT
Edmund Ludlow and Benjamin H. Irwin, Columbus, Ind., assignors to Arvin Industries, Inc., Columbus, Ind., a corporation of Indiana
Filed Dec. 4, 1961, Ser. No. 156,777
5 Claims. (Cl. 181—59)

This application is a continuation-in-part application of our copending application Serial No. 88,977, filed February 13, 1961. The instant invention relates to a silencing element for a sound attenuating gas conduit, and more particularly to a silencing element which is removably mounted in such a conduit.

It is an object of our invention to provide a silencing element for a sound attenuating gas conduit which will attenuate high frequency sound waves, which will have limited space requirements within such a gas conduit and which can be easily and quickly replaced within such a gas conduit.

In accordance with our invention, as it is employed in an automotive exhaust system, there is provided an exhaust gas conduit connected to the exhaust manifold of an engine and carrying a plurality of sound attenuating resonators primarily adapted to attenuate those sound wave frequencies below 1,500 cycles per second. Such resonators are disposed in operative association with the gas stream moving through the conduit and are located substantially upstream from the discharge end of said conduit.

The instant invention is concerned with a high frequency silencing element carried within said conduit adjacent the discharge end thereof. Said element comprises an elongated, closed-end, perforated tube holding a wadding of a porous sound attenuating material. Such material may, through the condensation of moisture within the conduit, its being subjected to the turbulence of the gases moving through the conduit, etc., become less porous and/or become broken into small particles which fall through the perforations in the tube, thus reducing its effectiveness. Our invention provides means for removably mounting the silencing element in the gas conduit to facilitate its replacement, and to this end, one or more members are secured to the perforated tube and project outwardly therefrom into engagement with means on said conduit for releasably retaining the silencing element in a fixed position within said conduit.

Other objects and features of our invention will become apparent from the more detailed description which follows and from the accompanying drawings, in which:

FIG. 1 is a partially sectioned isometric view of a sound attenuating exhaust system having a silencing element embodying our invention mounted therein;

FIG. 2 is an enlarged fragmentary longitudinal section of the portion of the conduit shown in FIG. 1 having our silencing element mounted therein, portions of said silencing element being broken away;

FIG. 3 is a vertical section taken on the line 3—3 of FIG. 2;

FIG. 4 is a fragmentary longitudinal section of an exhaust gas conduit having a modified form of our silencing element mounted therein, portions of said silencing element being shown in section;

FIG. 5 is a vertical section taken on the line 5—5 of FIG. 4;

FIG. 6 is a fragmentary longitudinal section of an exhaust gas conduit having a modified form of silencing element mounted therein, portions of said silencing element being shown in section; and FIG. 7 is a vertical section taken on the line 7—7 of FIG. 6.

As shown in FIG. 1, our silencing element is mountable in a conduit 10 adapted to be connected at one end to an exhaust manifold 12 by a conventional mounting flange 14, with its opposite end open to the atmosphere. Conveniently, the conduit 10 may have the same outer diameter as the exhaust and tail pipes used in conventional exhaust systems. For example, it may have a diameter of one and three-quarters to two and one-half inches, the diameter of conventional exhaust pipes and tail pipes used on automobiles; but it may have a larger diameter, say as large as four inches, the diameter of conventional exhaust and tail pipes used on trucks, busses, and other large vehicles. While the conduit 10 may be a unitary length, it may also be formed from a plurality of short interconnected lengths of conduit.

In the exhaust system illustrated in FIG. 1, our high frequency silencing element 16 is mounted in the conduit 10 immediately adjacent the rear thereof, and a plurality of low frequency silencing elements 18 are mounted in said conduit upstream from the silencing element 16. The silencing elements 18 are adapted to attenuate the lower range of sound wave frequencies, that is, frequencies below 1,500 cycles per second, and to this end, each of the elements 18 may comprise a length of metal-tubing 20 closed at its opposite ends as by end walls 22. A baffle plate 24 is mounted within the tubing 20 intermediate its ends to compartment the tubing 20 into a pair of elongated cavities or resonator volumes 26. Each of the volumes 26 has associated with it a resonator throat-forming tube 28 having one of its ends open to its respective volume 26 and its opposite end open to the gas-flow passage formed by the conduit 10. In this manner, each of the volumes 26 is directly coupled by means of its throat 28 with the gas stream moving through the conduit 10 so that the resonators formed by said throats and volumes will attenuate the noise level of the low frequency sound waves in the exhaust gases. As shown, the elements 18 may be mounted within the conduit 10 on brackets 30, conveniently in the form of sheet-metal stampings which are rigidly secured to said elements and to the inner wall of the conduit 10.

The silencing elements 18 are adapted to attenuate low frequency sound waves below 1,500 cycles per second, and because of their throat and volume constructions, may be tuned to preferentially attenuate different frequencies and/or frequency ranges below 1,500 cycles per second. The low frequency sound waves to which the elements 18 may be tuned produce sound pressure points along the length of the conduit and inwardly from the ends thereof. Thus, as described in our copending application Serial No. 88,977, filed February 13, 1961, for the elements 18 to be most effective, they should be located inwardly from the ends of the conduit adjacent the pressure points of the frequencies to which they are tuned.

The silencing element 16 is adapted to preferentially attenuate those sound wave frequencies above 1,500 cycles per second and is mounted within the conduit 10 immediately adjacent the discharge end thereof in the path of the gas stream moving therethrough. As shown in FIG. 2, the silencing element 16 comprises an elongated tube 32 having a plurality of perforations 34 formed therein to render said tube at least 30% open. Said tube has a cross-sectional area in the range of from about 25% to about 75% of the cross-sectional area of the conduit 10 within the axial extent of the element 16 whereby said element will effect the necessary degree of attenuation without requiring it to have such an excessive axial length as to require it to extend into the curved section of the conduit 10, and whereby it will not unduly obstruct gas flow through the conduit and create excessive back pressures therein. As shown, the ends of the tube 32 are closed by a pair of end closures 36 removably mounted on said tube by screws 37.

As shown in FIG. 2, the interior of the tube 32 is filled with a wadding 39 of a porous, fibrous sound attenuating material, such as asbestos fibers, stainless steel wool, glass fibers, or the like, carried in a fine mesh screen 42 of a corrosion resistant material, such as stainless steel, aluminum, or the like, interposed between said sound attenuating material and the tube 32. Like the tube 32, the screen 42 is at least 30% open so that it does not interfere with the acoustic coupling between the sound attenuating material 39 and the gases moving through the conduit 10. However, the fine mesh of the screen 42 renders it more difficult for any of said sound attenuating material to break away and fall through the larger perforations 34 in the tube 32. And conversely, the fine mesh of the screen 42 renders it more difficult for moisture and other foreign matter to come into contact with the sound attenuating material 39 to reduce its porosity and thus its sound attenuating effectiveness.

As will be appreciated, the silencing elements 18 are formed wholly of sheet-metal components which are rigidly secured together, and their destruction by corrosion or the effects of the turbulent gas stream moving through the conduit 10 is negligible. However, in spite of the presence of the screen 42 the sound attenuating material 39 may lose its effectiveness as by portions of said sound attenuating material breaking off under the influence of the turbulent blast of the exhaust gases moving through the conduit 10, by moisture or other foreign matter reducing its porosity, or the like.

Our invention is therefore characterized by means for removably mounting the tube 32 in the conduit 10 to permit the silencing element 16 to be easily replaced when the sound attenuating material 39 loses its effectiveness. In the embodiment of invention shown in FIGS. 2 and 3 there is provided a pair of brackets having flanges 46 at one of their ends rigidly secured to the tube 32 and interconnected by webs 48 to flanges 50 at the opposite bracket ends. As shown, the flanges 50 curve to abut the inner face of the conduit 10 in face-to-face relationship and are rigidly connected to said conduit by screws 51. Preferably, the webs 48 have a length sufficient that with the flanges 50 secured to the conduit 10, the face of the tube 32 opposite the brackets will bear against the conduit 10. Thus, to replace the silencing element shown in FIGS. 2 and 3, it is merely necessary to remove the screws 51, slide the used element out the discharge end of the conduit and a new element into position, and reinsert the screws 51 through the conduit into brackets on the new element.

The embodiment of the silencing element shown in FIGS. 4 and 5 also comprises a tube 53 provided with end closures 55 and perforated, as at 56. Carried within the tube is a porous sound attenuating material 58 around which is disposed a screen 60. The silencing element shown in FIGS. 4 and 5 is removably mounted in a conduit 61 by an axially extending T-shaped hanger 62 projecting outwardly from the tube 53. The shank 63 on the hanger 62 is slidable in a slot 64 formed in the conduit 61 and extending forwardly from the discharge end thereof. In this manner, the shank 63 can be slid forwardly in the slot 64 to the forward end thereof, and the hanger cross-bar 65, which has a lateral extent greater than that of the slot, will thus rest on the outer face of the conduit 61 to support the silencing element in an operative position within said conduit. The spacing between the cross-bar 65 and the adjacent portion of tube 53 is such that there is a binding fit between said conduit and the cross-bar and tube, whereby the silencing element will be releasably retained in said conduit, but said element may, by force, be slid out the discharge end of the conduit and replaced by a new silencing element.

The embodiment of the silencing element shown in FIGS. 6 and 7 also comprises a tube 66 provided with end closures 67 and perforated, as at 68. Carried within the tube 66 is a porous sound attenuating material 69 around which is disposed a screen 70. The silencing element shown in FIGS. 6 and 7 is removably mounted in a conduit 71 by a pair of axially extending fingers 72 and 73 rigidly mounted on the tube 66 and projecting outwardly therefrom. Each of said fingers is slidably received in an outwardly projecting bead 74 formed in the conduit 70 and extending forwardly from the discharge end of said conduit, whereby said fingers and beads operatively carry the silencing element within the conduit 71. The fingers 72 and 73 bindingly fit in the beads 74, whereby the silencing element will be bindingly retained in the conduit 71, but said silencing element can, by force, be slid out the discharge end of the conduit and replaced by a new element. To assure the most rigid positioning in the conduit 71, the fingers 72 and 73 are spaced apart 180 degrees, but said spacing may, of course, be as small as 90 degrees or less provided the beads 74 bind against said fingers with sufficient force to hold the silencing element in position with the conduit.

Each embodiment of the high frequency silencing element may employ the same type of silencing attenuating material, and the degree of openness of the screens and perforated tubes is the same in each embodiment. As shown, the mounting means in each embodiment also disposes the silencing element adjacent the top of the gas conduit to thus minimize any tendency of the silencing element to create back pressures and to dispose the silencing element in a position where its sound attenuating material will be out of contact with any condensate lying on the bottom of the conduit.

We claim:

1. A silencing element for an exhaust gas conduit, comprising an elongated perforated tube removably mounted in said conduit in a readily accessible position adjacent the discharge end thereof, a pair of end caps closing the ends of said tube with at least one of said pair of end caps being removably mounted on said tube, said tube having a cross-sectional area of from about 25% to about 75% of the cross-sectional area of said conduit, a porous, fibrous wadding of sound attenuating material carried in said tube, and one or more outwardly projecting members on said tube releasably interconnected to means on said conduit for releasably retaining said tube in a fixed position within said conduit with its axis offset from the axis of said conduit and having at least the major portion of its wall surface in spaced relation to inner face of said conduit.

2. A silencing element as set forth in claim 1 in which said members comprise a plurality of brackets mounted on said tube and having their ends remote from said tube curved to engage the inner face of said conduit in face-to-face engagement, and said means comprises fastening element extending through openings formed in said conduit for engagement with said bracket ends.

3. A silencing element as set forth in claim 1 in which said means comprising a plurality of outwardly projecting axially extending beads formed in said conduit in which said members are received.

4. A silencing element as set forth in claim 3 with the addition that one end of said beads terminates at the discharge end of said conduit and said members are slidably received in said beads.

5. A silencing element as set forth in claim 1 in which said means comprises a slot formed in said conduit and extending forwardly from the discharge end thereof, and said one or more outwardly projecting members comprises an axially extending, generally T-shaped projection on said tube slidably carried in said slot, the crossbar of said T-shaped projection being disposed externally of said conduit and the portion of said conduit adjacent said slot being bindingly receivable between said crossbar and the adjacent portions of said tube.

References Cited in the file of this patent

UNITED STATES PATENTS

| | | |
|---|---|---|
| 1,575,657 | Straussler | Mar. 9, 1926 |
| 1,811,762 | Schnell | June 23, 1931 |
| 2,056,608 | Jack | Oct. 6, 1936 |
| 2,185,584 | Boyce | Jan. 2, 1940 |
| 2,297,046 | Bourne | Sept. 29, 1942 |

FOREIGN PATENTS

| | | |
|---|---|---|
| 317,630 | Switzerland | Jan. 15, 1957 |
| 678,344 | Great Britain | Sept. 3, 1952 |